United States Patent
Mariani et al.

(10) Patent No.: US 7,366,896 B1
(45) Date of Patent: Apr. 29, 2008

(54) SYSTEMS AND METHODS FOR LIMITING ACCESS TO POTENTIALLY DANGEROUS CODE

(75) Inventors: Rico Mariani, Kirkland, WA (US); David M. Broman, Redmond, WA (US); Sanjeev K. Rajan, Kirkland, WA (US); Kristi L. Cooper, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 998 days.

(21) Appl. No.: 09/650,712

(22) Filed: Aug. 29, 2000

(51) Int. Cl.
- H04L 9/00 (2006.01)
- H04L 9/32 (2006.01)
- G06F 11/30 (2006.01)
- G06F 12/14 (2006.01)
- G06F 15/16 (2006.01)
- H04N 1/32 (2006.01)

(52) U.S. Cl. .............. 713/156; 713/164; 713/176; 713/170; 713/181; 713/166; 713/187; 713/154; 713/155; 709/217; 709/221; 709/218

(58) Field of Classification Search ............... 713/164, 713/200, 120, 156, 176, 170, 181, 166, 175, 713/155; 395/186, 188.01, 425; 717/11, 717/203; 709/217, 221, 218, 219
See application file for complete search history.

(56) References Cited

U.S. PATENT DOCUMENTS

| | | | | |
|---|---|---|---|---|
| 5,835,914 A | * | 11/1998 | Brim | 707/206 |
| 5,958,051 A | * | 9/1999 | Renaud et al. | 713/200 |
| 5,974,549 A | * | 10/1999 | Golan | 713/200 |
| 6,058,482 A | * | 5/2000 | Liu | 713/201 |
| 6,253,323 B1 | * | 6/2001 | Cox et al. | 713/176 |
| 6,347,398 B1 | * | 2/2002 | Parthasarathy et al. | 717/178 |
| 6,499,105 B1 | * | 12/2002 | Yoshiura et al. | 713/176 |
| 6,499,109 B1 | * | 12/2002 | Balasubramaniam et al. | 713/201 |
| 6,567,918 B1 | * | 5/2003 | Flynn et al. | 713/200 |
| 6,615,088 B1 | * | 9/2003 | Myer et al. | 700/20 |
| 6,880,083 B1 | * | 4/2005 | Korn | 713/170 |
| 6,918,036 B1 | * | 7/2005 | Drews | 713/176 |
| 7,275,086 B1 | * | 9/2007 | Bodnar | 709/218 |
| 2001/0013096 A1 | * | 8/2001 | Luckenbaugh et al. | 713/154 |
| 2002/0004900 A1 | * | 1/2002 | Patel | 713/155 |

FOREIGN PATENT DOCUMENTS

EP 982927 A1 * 3/2000

* cited by examiner

*Primary Examiner*—Ayaz Sheikh
*Assistant Examiner*—Shin-Hon Chen
(74) *Attorney, Agent, or Firm*—Lee & Hayes, PLLC

(57) ABSTRACT

Systems, methods and data structures are described for attaching a digital signature to a web page and authenticating the digital signature before allowing the web page to invoke a software control on a computer that has downloaded the web page. Unauthorized users cannot gain access to a control on a computer through a web page that is downloaded to the computer, if the source of the web page or application cannot be authenticated or is not a trusted source.

34 Claims, 3 Drawing Sheets

SYSTEMS AND METHODS FOR LIMITING ACCESS TO POTENTIALLY DANGEROUS CODE

TECHNICAL FIELD

The systems and methods described herein relate to network security and, more particularly, to securing web pages and software controls to prevent unauthorized web pages from utilizing software controls on a client computer to corrupt or misappropriate data on the client computer.

BACKGROUND

Website developers frequently utilize software controls to provide specialized functionality to web applications. Generally, a software control (hereinafter, "control") is defined as program instructions that manage data-handling tasks. Controls are typically reusable software components in binary form that can be plugged into other software components with relatively little effort. For example, a stock ticker control may be used to add a live stock ticker to a web page, or an animation control can be used to add animation features to a web page.

Controls may be downloaded to a Client computer together with the web pages that invoke them. Once a control is downloaded by a web page, it remains on the Client computer. Subsequent execution of the web page will execute the control without requiring the control to be downloaded again. However, other web pages may also invoke the control, even though the control was not downloaded with that web page. This invocation may even be accomplished without the user's knowledge.

This can lead to exploitation of the control by an unauthorized user. The unauthorized user may use the control for something other than its intended function, or use the control function in a manner contrary to the intended use of the control function. The results of such exploitation can be loss or corruption of data, exposure of sensitive materials, or other security compromises.

As an example of how serious this exploitation can be, consider a user who downloads a control that accesses banking software on the user's computer. The user trusts the author of the control and the website, and uses the control according to its intended function. But when the user has finished using the control, the user may not even be aware that the control and its functionality remain on the user's computer. Thereafter, a web page set up by a hacker and accessed by the user may invoke the control and gain access to the user's banking software. The hacker may then have the ability to write unauthorized checks on the user's account, transfer funds electronically from the account, and so on.

To help combat this problem, signed controls have been developed. Signed controls contain a digital signature that uniquely identifies the author of the control. When the signed control is accessed, the control is authenticated by the downloading computer. Once authenticated, a determination is made as to whether the author of the control is an authorized source for controls. If so, the control may be invoked. However, this verification is only made when the control is initially downloaded. Once the user downloads the control, the control may be invoked by any other application without authorization from the user.

In addition to signed controls, the notion of trusted sites has been utilized whereby a user may confidently use a control downloaded from certain user-identified sites. Again, however, the problem remains that once a user has authorized the download of a control, the user can no longer safeguard against unauthorized use of that control.

Some operating systems, such as the WINDOWS family of operating systems produced by MICROSOFT CORPORATION, provide a feature whereby a control writer can specifically mark a control as being "safe" to avoid having to perform additional steps each time the control is used. A control can only be marked as safe if no other web site could possibly use the control in an unsafe manner. Once the control is marked as safe, it can be invoked without further precautionary measures being taken.

It is desirable to mark a control as safe so that a computer user can be confident that the control can be downloaded without causing harm to the user's computer. However, many valuable controls that can be safely invoked cannot be marked as safe because they do not satisfy the requirement that they cannot be used in an unsafe manner. These controls must be marked as "unsafe" even though they can be invoked in a safe manner. This is problematic in that a user may not download such a control simply because it is marked as unsafe, since the user does not know the exact reason that the control has been marked as unsafe. Such an unsafe designation may cause unnecessary apprehension and inconvenience to the user.

The implementations described herein overcome this disadvantage and allow a control writer to mark a control as safe, since malicious web pages will be prevented from invoking the safe control in an unsafe manner.

SUMMARY

Methods and systems are described herein that allow a control to be invoked only by an authenticated and authorized application. A web page is described that invokes a software control that has been previously downloaded to a Client computer, or which is contained in the web page to be downloaded by the Client computer. The web page is digitally signed by the author so that the Client computer can ensure that the control is being invoked by a trusted source. A confirmation module located in a web browser on the Client computer or in the control itself authenticates the digital signature and confirms whether the web page is authorized by the Client computer to invoke the control. If the web page is authenticated and authorized, then the Client computer allows the web page to invoke the control.

The described implementations solve the problems presented above, because an invoking application is authenticated and authorized each time the control is invoked rather than only when the control is downloaded. Therefore, an unauthorized user cannot gain access to a control previously downloaded onto the Client computer.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
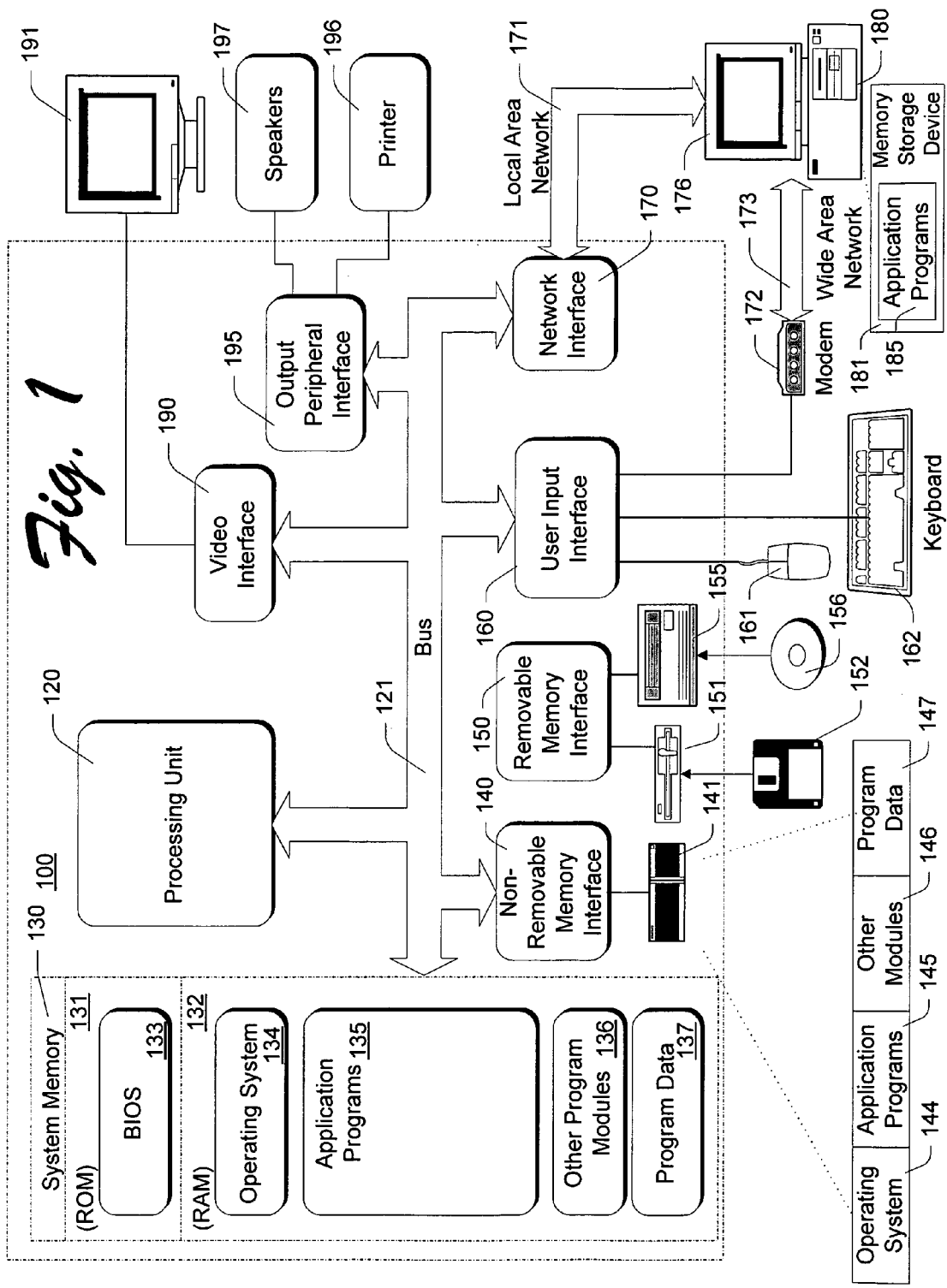
FIG. 1 is a diagram of an exemplary computer system on which the described embodiments may be implemented.

The invention is illustrated in the drawings as being implemented in a suitable computing environment. Although not required, the invention will be described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Exemplary Computer Environment

The various components and functionality described herein are implemented with a number of individual computers. FIG. 1 shows components of a typical example of such a computer, referred to by reference numeral 100. The components shown in FIG. 1 are only examples, and are not intended to suggest any limitation as to the scope of the functionality of the invention; the invention is not necessarily dependent on the features shown in FIG. 1.

Generally, various different general purpose or special purpose computing system configurations can be used. Examples of well known computing systems, environments, and/or configurations that may be suitable for use with the invention include, but are not limited to, personal computers, server computers, hand-held or laptop devices, multi-processor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 1, the components of computer 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 100 typically includes a variety of computer-readable media. Computer-readable media can be any available media that can be accessed by computer 100 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface such as interface 150.

The drives and their associated computer storage media discussed above and illustrated in FIG. 1 provide storage of computer-readable instructions, data structures, program modules, and other data for computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 100 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer may operate in a networked environment using logical connections to one or more remote computers, such as a remote computer 180. The remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 100 is connected to the LAN 171 through a network interface or adapter 170. When used in a WAN networking environment, the computer 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 100, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
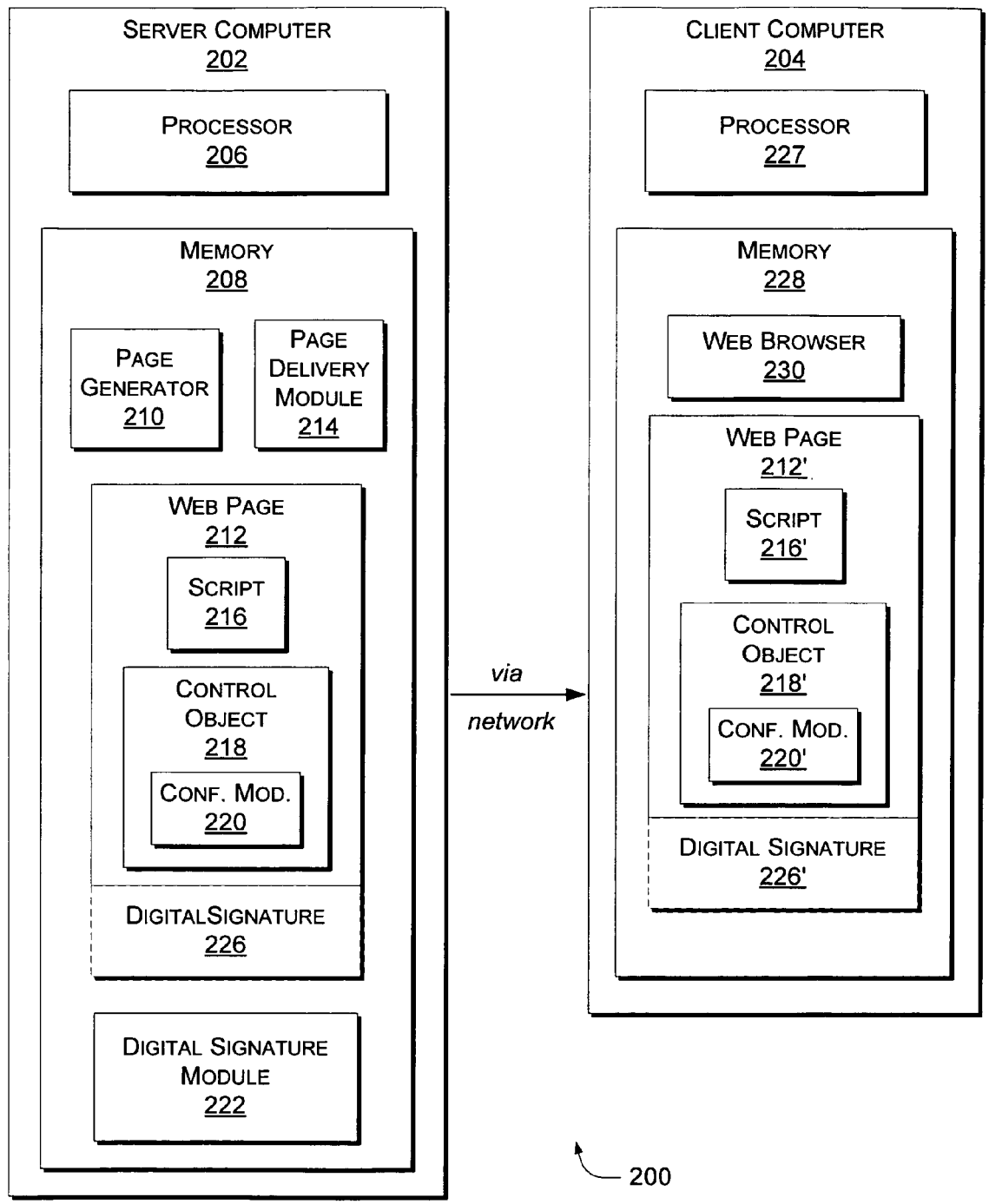
FIG. 2 is a block diagram of a server computer and a client computer according to an implementation described herein.

FIG. 2 is a block diagram of a Server-Client system 200 in accordance with the implementations described herein. The system 200 includes a Server computer 202 and a Client computer 204. The Server computer 202 has a processor 206 and memory 208. The memory 208 stores a page generator 210 for generating web pages, including a web page 212 shown in the memory 208. A page delivery module 214 in the memory 208 delivers the web page 212 to the Client computer 204 via a network (not shown).

The web page 212 contains executable script 216 and a control object 218, which is invoked by the script 216 when the script 216 is executed on the processor 206. A confirmation module 220 is included in the control object 218. As will be discussed in greater detail below, the confirmation module 220 is transmitted to the Client computer 204 with the control object 218 where it authenticates any web page that attempts to invoke the control object 218 and determines if an authenticated source is authorized to invoke the control object 218.

A digital signature module 222 is stored in the memory 208 of the Server computer 202. The digital signature module 222 is configured to digitally sign the web page 212 using any method known in the art. When the web page 212 is digitally signed, a digital signature 226 is attached to the web page 212. The digital signature 226 enables the Client computer 204 to authenticate the source of the web page 212.

Depending on the implementation, the digital signature module 222 may sign each web page generated by the page generator 210, or the digital signature module 222 may only sign web pages that invoke a control. Regardless of the implementation used in the present example, the web page 212 is digitally signed with the digital signature 226 because the web page 212 contains the control object 218 which is invoked by the web page 212.

The control object 218 is a reusable software component that conforms to a standard, such as the COM (common object model) standard. The control object 218 may be used in a variety of containers, such as a Visual Basic program, a C++ program, an HTML web page, etc. The control object 218, when executed, performs a function within the Client computer 204. This function may include, but is not limited to, accessing data, manipulating data, providing animation, displaying objects, etc.

The Client computer 204 includes a processor 227 and memory 228. A web browser 230 is stored in the memory 228 and executes on the processor 227. The web browser 230 enables the Client computer 204 to access the web page 212 on the server 202. As shown in FIG. 2, a copy of the web page 212 (designated as web page 212') has been downloaded to the Client computer 204 and is stored in the memory 228. The downloaded web page 212' includes a script 216' (a copy of the script 216) and a control object 218' (a copy of the control object 220). A copy of the confirmation module 220 (designated as confirmation module 218') has been downloaded with the web page 212' and is a part of the control object 218'. The web page 212' is digitally signed with a digital signature 226' that was downloaded with the web page 212'.

Figure 3:
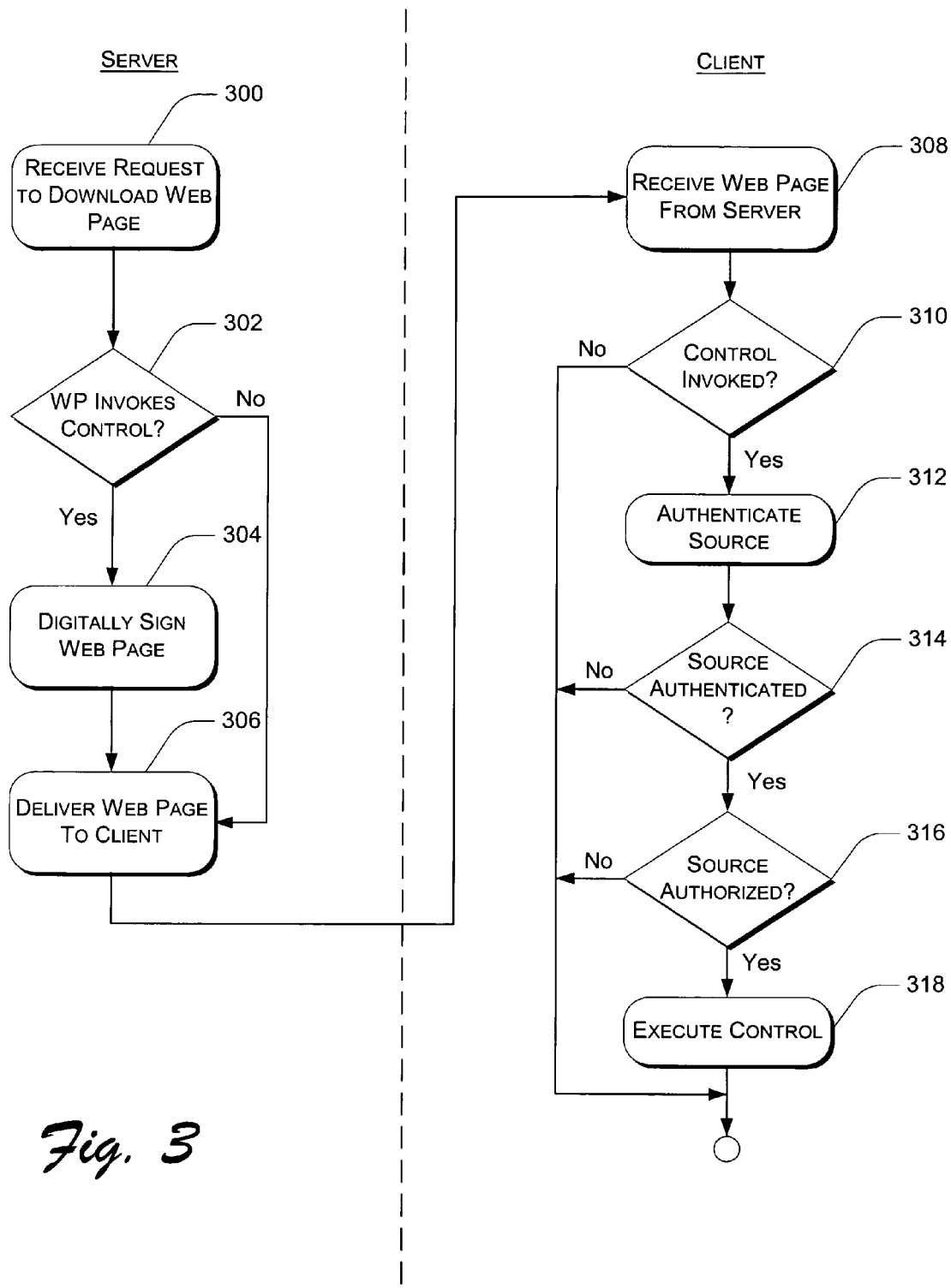
FIG. 3 is a flow diagram of a process to prevent use of a control by an unauthorized application.

FIG. 3 is a flow diagram of a method to prevent execution of the control object 218' by an unauthorized web page. For this discussion, continuing reference will be made to the elements shown in FIG. 2.

At step 300, the web browser 230 on the Client computer 204 requests a download of the web page 212 from the Server computer 202. If the web page 212 includes script 216 that invokes a control object ("Yes" branch, step 302), then the digital signature module 222 on the Server computer 202 digitally signs the web page 212 by attaching the digital signature 226 to the web page 212 at step 304. The signed web page 212 is delivered to the Client computer 204 at step 306. If the web page 212 does not invoke a control object ("No" branch, step 302), the web page 212 is delivered to the Client computer 204 at step 306 without a digital signature.

It is noted that step 302 is an optional step. If step 302 is not included in the process, the digital signature module 222 will compute and attach a digital signature to every web page that is downloaded from the Server computer 202. The selected implementation depends on which implementation requires lower requirements of server resources.

At step 308, the Client computer 204 receives the web page 212' from the Server computer 202. On many systems, a user of the Client computer 204 will be notified at this point if the user wishes to download the web page 212 having the control object 218. For purposes of the present discussion, it is assumed that the user downloads the control object 218' with the web page 212'.

If a web page or other application attempts to invoke the control object 218' on the Client computer 204 ("Yes" branch, step 310), the confirmation module 220' authenticates the source of the web page 212' at step 312. The confirmation module 220' determines from the digital signature 226' if the web page 212' is from a source the web page 212' purports to come from. The exact method of doing this is well known in the art.

If the confirmation module 220' determines that the web page 212' has come from the source indicated by the web page 212' ("Yes branch, step 314), the confirmation module 220' then determines if the source is an authorized source at step 316. This can be done in several ways. The author of the control object 218' may include a list of sources that the author trusts to invoke the control object 218', or the user may be prompted at some point by the control object 218' to enter sources which the user trusts to invoke the control object 218' safely, or a list of trusted sites may be stored in the memory of the Client computer 204, etc. With any such implementation, the control object 218' checks the name of the source against one or more source names to determine if the source is authorized to invoke the control object 218'.

It is also noted that, in another implementation, the steps performed by the confirmation module 220' may be performed by the web browser 230 or by a module located in the web browser 230. In such an implementation, when the web page 212' attempts to invoke the control object 218', the web browser 230 will detect or be notified of the event and will attempt to authenticate and authorize the source of the web page 212'.

If the confirmation module 220' determines that the web page 212' has come from an authenticated and authorized source (the Server computer 202 in this example), then the control object 218' is executed at step 318. If the source cannot be authenticated ("No" branch, step 314) or if the source is not authorized to invoke the control object 218' ("No" branch, step 316), then the control object 218' will not be executed.

CONCLUSION

Control objects embedded in web pages are powerful tools that give a programmer free access to a user's computer. The implementations described provide a user with a way to prevent control objects from being executed by unauthorized users. In this way, the user is assured of the source of the control object and, if the user trusts the source, the user can confidently allow the control object to be invoked.

A user is also assured that once a control object is downloaded to the user's computer, it cannot be invoked by a web page or other application from a source other than the source of the web page or application that originally included the control object.

Although the implementations described herein have been described in language specific to structural features and/or methodological steps, it is to be understood that the invention defined in the appended claims is not necessarily limited to the specific features or steps described. Rather, the specific features and steps are disclosed as preferred implementations.

The invention claimed is:

1. A method, comprising:
   a first electronic device digitally signing a web page, wherein the web page includes code to invoke a control object, and wherein the web page does not include the control object; and
   subsequent to digitally signing the web page, the first electronic device delivering the web page to a second electronic device capable of authenticating the source of the web page based on the digital signature such that the second electronic device executes at least a portion of the web page in response to authenticating the digital signature.

2. The method as recited in claim 1, wherein digitally signing further comprises attaching the digital signature to the web page.

3. The method as recited in claim 1, further comprising:
   in an event that the web page does not include code to invoke the control object, the first electronic device delivering the web page without a digital signature.

4. The method as recited in claim 1, wherein the web page includes a confirmation module that is used by the second electronic device to authenticate the digital signature.

5. The method as recited in claim 1, wherein the web page is generated in an active server page (ASP) environment.

6. The method as recited in claim 1, farther comprising designating one or more sources of a web page authorized to invoke the control object.

7. The method as recited in claim 1, wherein the control object includes a confirmation module configured to authenticate the digital signature.

8. The method as recited in claim 7, wherein the confirmation module is further configured to determine if the web page comes from a source that is authorized to invoke the control object and the control object is invoked only if the source of the web page is authorized to invoke the control object.

9. The method as recited in claim 7, wherein the confirmation module is called by the web page prior to the web page invoking the control object.

10. A method, comprising:
a first electronic device receiving from a second electronic device, a request to download a web page; and
in response to receiving the request, the first electronic device:
determining whether the web page includes code to invoke a control object;
in an event that the web page includes code to invoke a control object, the first electronic device digitally signing the web page; and
delivering the web page to the second electronic device, wherein the second electronic device is capable of authenticating the source of the web page based on the digital signature such that the second electronic device executes at least a portion of the web page in response to authenticating the web page digital signature.

11. The method as recited in claim 10, wherein a control object digital signature is associated with the control object.

12. The method as recited in claim 10, wherein digitally signing the web page further comprises deriving the web page digital signature.

13. The method as recited in claim 10, further comprising:
in an event that the web page does not include code to invoke the control object:
in response to receiving the request, the first electronic device delivering the web page to the second electronic device without the web page digital signature.

14. The method as recited in claim 10, wherein the web page includes a confirmation module that is used by the second electronic device to authenticate the web page digital signature.

15. The method as recited in claim 10, wherein the control object includes a confirmation module configured to authenticate the web page digital signature.

16. The method as recited in claim 15, further comprising the second electronic device invoking the confirmation module prior to executing the code to invoke the control object.

17. The method as recited in claim 10, further comprising a confirmation module determining whether a source of the web page is authorized to invoke the control object such that the web page is prevented from invoking the control object if the source of the web page is not authorized to invoke the control object.

18. A method, comprising:
a first electronic device determining whether a web page includes code to invoke a control object, wherein the control object does not have an associated digital signature; and
based on a determination that the web page includes code to invoke the control object:
the first electronic device digitally signing the web page; and
subsequent to digitally signing the web page, the first electronic device delivering the web page to a second electronic device capable of authenticating a source of the web page based on the digital signature such that the second electronic device executes the code to invoke the control object in response to authenticating the digital signature, and such that the second electronic device prevents execution of the code to invoke the control object in response to failing to authenticate the digital signature.

19. The method as recited in claim 18, wherein digitally signing the web page further comprises deriving the digital signature.

20. The method as recited in claim 18, further comprising:
based on a determination that the web page does not include code to invoke the control object:
the first electronic device delivering the web page to the second electronic device without the digital signature.

21. The method as recited in claim 18, wherein the web page includes a confirmation module that is used by the second electronic device to authenticate the digital signature.

22. The method as recited in claim 18, wherein the control object includes a confirmation module configured to authenticate the digital signature.

23. The method as recited in claim 18, farther comprising a confirmation module determining whether a source of the web page is authorized to invoke the control object such that the web page is prevented from invoking the control object if the source of the web page is not authorized to invoke the control object.

24. The method as recited in claim 23, further comprising the second electronic device invoking the confirmation module prior to executing the code to invoke the control object.

25. A method, comprising:
a first electronic device determining whether a web page includes code to invoke a control object, wherein a first digital signature is associated with the control object;
based on a determination that the web page includes code to invoke the control object, the first electronic device digitally signing the web page with a second digital signature; and
subsequent to digitally signing the web page with the second digital signature, the first electronic device delivering the web page to a second electronic device capable of authenticating the source of the web page based on the second digital signature such that the second electronic device executes the code to invoke the control object in response to authenticating the second digital signature, and such that the second electronic device prevents execution of the code to invoke the control object in response to failing to authenticate the source of the web page based on the second digital signature.

26. The method as recited in claim 25, wherein digitally signing the web page further comprises deriving the second digital signature.

27. The method as recited in claim 25, further comprising:
based on a determination that the web page does not include code to invoke the control object:
the first electronic device delivering the web page to the second electronic device without the second digital signature.

28. The method as recited in claim 25, wherein the web page includes a confirmation module that is used by the second electronic device to authenticate the second digital signature.

29. The method as recited in claim 25, wherein the control object includes a confirmation module configured to authenticate the second digital signature.

30. The method as recited in claim 25, further comprising a confirmation module determining whether a source of the web page is authorized to invoke the control object such that the web page is prevented from invoking the control object if the source of the web page is not authorized to invoke the control object.

31. The method as recited in claim 30, further comprising the second electronic device invoking the confirmation module prior to executing the code to invoke the control object.

32. One or more tangible computer-readable media comprising computer-executable instructions that, when executed, direct a first computing device to:
- determine whether a web page includes code to invoke a control object, wherein the control object does not have an associated digital signature; and
- based on a determination that the web page includes code to invoke the control object, digitally signing the web page, wherein the digital signature is not directly associated with the control object; and
- deliver the web page to a second computing device capable of authenticating the source of the web page based on the digital signature such that the second computing device executes the code to invoke the control object in response to authenticating the source of the web page based on the digital signature, and such that the second computing device prevents execution of the code to invoke the control object in response to failing to authenticate the source of the web page based on the digital signature.

33. One or more tangible computer-readable media comprising computer-executable instructions that, when executed, direct a first computing device to:
- determine whether a web page includes code to invoke a control object, wherein a first digital signature is associated with the control object;
- based on a determination that the web page includes code to invoke the control object, digitally sign the web page with a second digital signature; and
- deliver the web page to a second computing device capable of authenticating the source of the web page based on the second digital signature such that the second computing device executes the code to invoke the control object in response to authenticating the source of the web page based on the second digital signature, and such that the second computing device prevents execution of the code to invoke the control object in response to failing to authenticate the source of the web page based on the second digital signature.

34. A system comprising:
- a page generator to generate a web page, wherein the web page includes a control object;
- a digital signature module to:
  - determining whether the web page includes a script to invoke the control object;
  - derive a digital signature from the web page;
  - based on a determination that the web page includes a script to invoke the control object, digitally signing the web page such that the digital signature is not directly associated with the control object, but is associated with the source of the web page; and
- a web page delivery module to deliver the web page to an electronic device.

* * * * *

UNITED STATES PATENT AND TRADEMARK OFFICE
CERTIFICATE OF CORRECTION

| | | |
|---|---|---|
| PATENT NO. | : 7,366,896 B1 | Page 1 of 1 |
| APPLICATION NO. | : 09/650712 | |
| DATED | : April 29, 2008 | |
| INVENTOR(S) | : Rico Mariani et al. | |

It is certified that error appears in the above-identified patent and that said Letters Patent is hereby corrected as shown below:

In column 8, line 53, in Claim 6, delete "farther" and insert -- further --, therefor.

In column 10, line 14, in Claim 23, delete "farther" and insert -- further --, therefor.

In column 12, line 18, in Claim 34, delete "determining" and insert -- determine --, therefor.

Signed and Sealed this
Twelfth Day of April, 2011

David J. Kappos
*Director of the United States Patent and Trademark Office*